United States Patent
Panwar et al.

(10) Patent No.: US 7,743,200 B1
(45) Date of Patent: Jun. 22, 2010

(54) INSTRUCTION CACHE USING PERFECT HASH FUNCTION

(75) Inventors: Ramesh Panwar, Pleasanton, CA (US); Philip A. Thomas, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 438 days.

(21) Appl. No.: 11/805,749

(22) Filed: May 24, 2007

(51) Int. Cl.
G06F 12/08 (2006.01)
(52) U.S. Cl. .......................... 711/3; 711/125; 711/128; 711/216; 711/E12.018
(58) Field of Classification Search ............... 711/216, 711/E12.018
See application file for complete search history.

(56) References Cited

U.S. PATENT DOCUMENTS

| | | | | |
|---|---|---|---|---|
| 5,530,958 | A * | 6/1996 | Agarwal et al. ............... | 711/3 |
| 5,694,567 | A * | 12/1997 | Bourekas et al. .............. | 711/3 |
| 6,161,166 | A * | 12/2000 | Doing et al. ................ | 711/125 |
| 6,275,919 | B1 * | 8/2001 | Johnson ..................... | 711/216 |
| 7,290,116 | B1 * | 10/2007 | Grohoski et al. ............. | 711/216 |
| 2003/0196026 | A1 * | 10/2003 | Moyer ...................... | 711/103 |
| 2006/0004995 | A1 * | 1/2006 | Hetherington et al. ........ | 712/235 |

OTHER PUBLICATIONS

Hallnor, Erik G. and Steven K. Reinhardt. "A Fully Associative Software-Managed Cache Design." Jun. 2000. ACM. ISCA 2000.*
Beale, Jay; Renaud Deraison; Haroon Meer; Roelof Temmingh; and Cherl Van Der Walt. Snort 2.0 Intrusion Detection. Mar. 1, 2003. Syngress. Section 1.2.*
Vandierendock, Hans; Philippe Manet; and Jean-Didier Legat. "Application Specific Reconfigurable XOR-Indexing to Eliminate Cache Conflict Misses." Mar. 2006. IEEE. Date '06.*
Hogg, Robert V. and Elliot A. Tanis. Probability and Statistical Inference. 2001. Prentice-Hall Inc. 6th ed. pp. 5-8.*
F. C. Botelho et al., "A New Algorithm for Constructing Minimal Perfect Hash Functions," Technical Report TR004/04, Department of Computer Science, Federal University of Minas Gerais, 2004, Oct. 2004.
F. C. Botelho et al., "A Practical Minimal Perfect Hashing Method," *4th International Workshop on Efficient and Experimental Algorithms (WEA05)*, Springer-Verlag Lecture Notes in Computer Science, vol. 3503, Santorini Island, Greece, May 2005, 488-500.
Bob Jenkins, "An order preserving minimal perfect hashing algorithm," available at http://burtleburtle.net/bob/hash/perfect.html (last visited Apr. 4, 2007).

* cited by examiner

*Primary Examiner*—Reginald G Bragdon
*Assistant Examiner*—Nathan Sadler
(74) *Attorney, Agent, or Firm*—Shumaker & Sieffert, P.A.

(57) ABSTRACT

In general, this disclosure describes techniques of storing data in and retrieving data from a cache of a computing device. More specifically, techniques are described for utilizing a "perfect hash" function to implement an associative cache within a computing device. That is, the associative cache implements a fully associative map between a predetermined set of addresses and data values, employing only a single tag fetch comparison.

37 Claims, 5 Drawing Sheets

INSTRUCTION CACHE USING PERFECT HASH FUNCTION

TECHNICAL FIELD

The invention relates to computing devices and, more particularly, to cache memories for computing devices.

BACKGROUND

A central processing unit (CPU) in a typical modern computer executes instructions stored in a main memory module. However, it may be a time consuming process to retrieve individual instructions from the main memory module. For this reason, modern computers typically include one or more instruction cache modules. These instruction cache modules are typically positioned closer to the CPU than the main memory module. Because the instruction cache modules are positioned closer to the CPU than the main memory module, the instruction cache modules may respond to requests for data faster than the main memory module. However, instruction cache modules typically hold less data than the main memory module. For this reason, not all instructions in a computer program may be stored in the instruction cache modules. When the CPU requests an instruction that is not in one of the instruction cache modules, it may be necessary to fetch the instruction from the main memory module, a comparatively time consuming operation. This is referred to as a "cache miss."

Instruction cache modules may be implemented using various degrees of associativity. For example, in a fully associative cache module, any cache sector of the cache module may store any given memory address. In contrast, in a partially associative cache module, there are a limited number of cache sectors that may store a given memory address. In direct-mapped cache module, there is only one possible cache sector for any given memory address. Among these implementations, fully associative cache modules may have a lowest incidence of cache misses because there are many cache sectors that may store a given instruction. However, fully associative cache modules may be the most expensive to implement. This is because a typical fully associate cache module is implemented using parallel comparators. These comparators may be expensive to implement and may consume large amounts of space and power. The number of comparators in a fully associative cache module tends to increase as the size of the number of cache sectors in the fully associative cache module increases. Alternatively, a typical fully associative cache may be implemented using content-addressable memories (CAMs). However, CAMs are typically associated with slow access times and high power consumption.

SUMMARY

In general, this disclosure describes techniques of storing data in and retrieving data from a cache of a computing device. More specifically, techniques are described for utilizing a "perfect hash" function to implement an associative cache within a computing device. That is, the associative cache implements a fully associative map between a predetermined set of addresses and data values, employing only a single tag fetch comparison.

For example, these techniques may identify n instructions of the program that are likely to be used most frequently, where n is the number of cache slots in an instruction cache. A minimal perfect hash function is then identified. This minimal perfect hash function maps memory addresses of the identified instructions to different hash values. The memory addresses and instructions are then stored in cache slots having slot indexes that are the same as the hash values of the memory addresses. When a processor executes the program, the cache module applies the identified minimal perfect hash function to memory addresses provided by the processor in order to return the instructions stored in the cache module.

In one embodiment, a method comprises profiling rates at which one or more processors of a first network device utilizes different software instructions. The method also comprises using the rates to identify software instructions that are most frequently utilized by the one or more processors. In addition, the method comprises identifying a first hash function that, for each of the identified software instructions, maps a memory address of the identified software instruction to a different hash value. Furthermore, the method comprises programming a cache module to apply the first hash function, wherein the cache module includes a set of instruction cache slots. The method also comprises loading each of the identified software instructions into instruction cache slots indicated by hash values calculated by applying the first hash function to the memory addresses of the identified software instructions. In addition, the method comprises receiving, with the cache module, a first read request for a first memory address. The method also comprises applying, with the cache module, the first hash function to a first memory address in order to calculate a first hash value that indicates a first one of the instruction cache slots when the cache module receives a first read request for the first memory address. The first hash value indicates a first one of the instruction cache slots. The method also comprises returning a copy of a first one of the instructions that is stored in the first one of the instruction cache slots.

In another embodiment, a device comprises a set of one or more processors. The device also comprises a memory that stores instructions of the computer programs. In addition, the device comprises a data utilization profiler (DUP) that profiles rates at which the one or more processors utilize different software instructions. Furthermore, the device comprises an address identification module (AIM) that uses the rates to identify software instructions that are most frequently utilized by the one or more processors. The device also comprises a function identification module (FIM) that identifies a first hash function that, for each of the identified software instructions, maps a memory address of the identified software instruction to a different hash value. In addition, the device comprises a cache module that comprises a first set of instruction cache slots that are capable of storing software instructions and a hash value calculator that applies the first hash function to memory addresses in order to generate hash values that indicate ones of the cache slots. The device also comprises a cache initialization module that programs the cache module to apply the first hash function and to load each of the identified software instructions into instruction cache slots indicated by hash values calculated by applying the first hash function to the memory addresses of the identified software instructions. When the cache module receives a first read request for a first memory address, the hash value calculator applies the first hash function to the first memory address in order to calculate a first hash value that indicates a first one of the instruction cache slots. The cache module returns an instruction stored in a first one of the instruction cache slots.

In another embodiment, a computer-readable medium comprises instructions. The instructions cause a processor to profile rates at which one or more processors of the computing device utilize different software instructions. The instructions also cause the processor to use the rates to identify software instructions that are most frequently utilized by the one or more processors. In addition, the instructions cause the processor to identify a first hash function that, for each of the identified software instructions, maps a memory address of the identified software instruction to a different hash value. The instructions also cause the processor to program a cache module to apply the first hash function, wherein the cache module includes a set of instruction cache slots. Furthermore, the instructions cause the processor to load each of the identified software instructions into instruction cache slots indicated by hash values calculated by applying the first hash function to the memory addresses of the identified software instructions. The cache module receives a first read request for a first memory address, applies the first hash function to a first memory address in order to calculate a first hash value that indicates a first one of the instruction cache slots when the cache module receives a first read request for the first memory address. The first hash value indicates a first one of the instruction cache slots. The cache module returns a copy of a first one of the instructions that is stored in the first one of the instruction cache slots.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
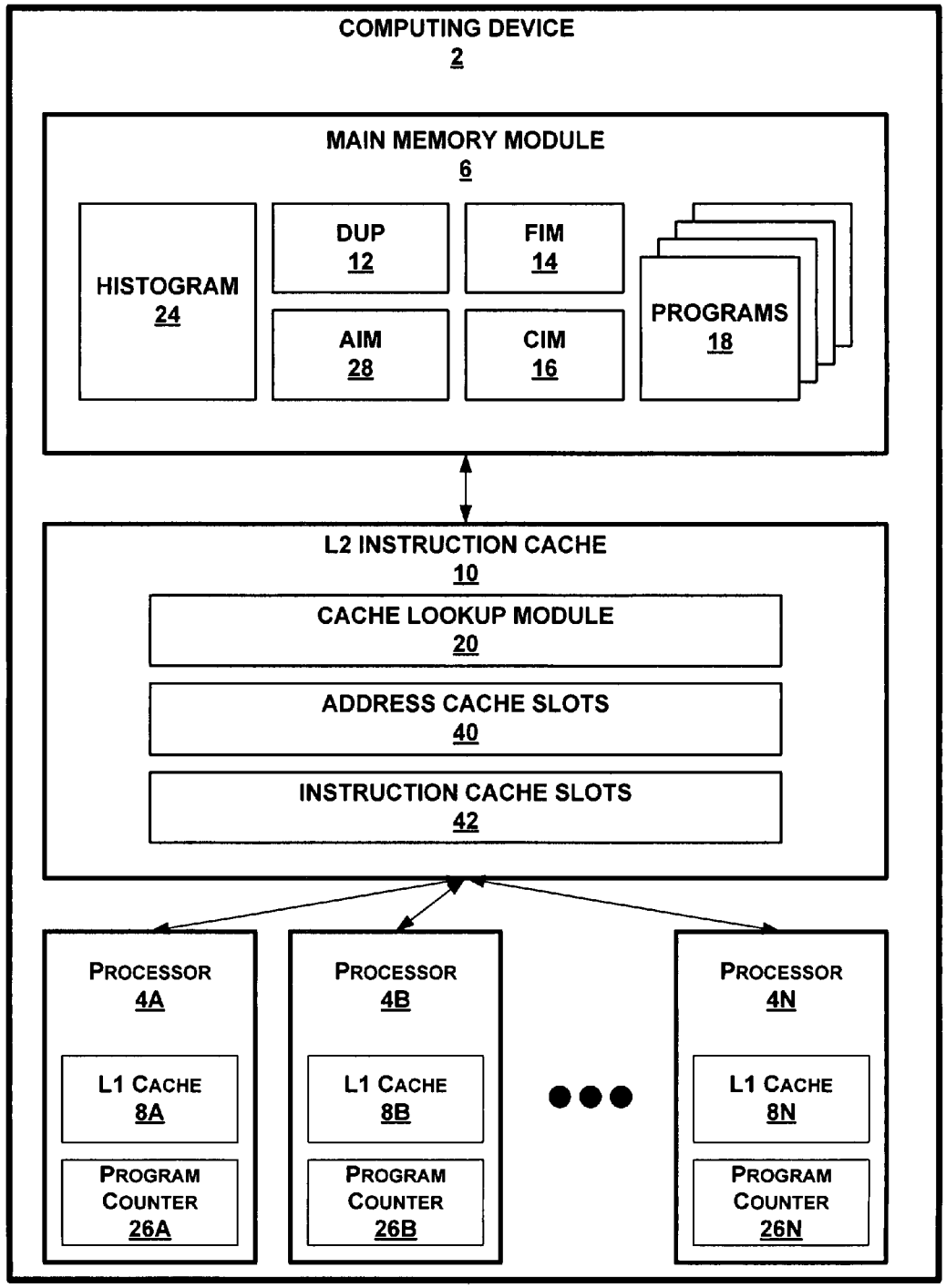
FIG. 1 is a block diagram illustrating an exemplary computing device.

FIG. 1 is a block diagram illustrating an exemplary computing device 2. Device 2 may comprise a network server, an intermediate network device, a personal computer, a laptop computer, a video game platform or console, a network device, a portable video game device, a video arcade system, an electronic gambling device, a graphics processing unit, a network appliance, a supercomputer, a computer integrated into a vehicle, a robotic device, a mobile radiotelephone, a point-of-sale device, a mainframe computer, a network television, a set-top box, a portable music player such as an iPod™, or another type of computing system.

Device 2 may include processors 4A through 4N (collectively "processors 4"). Processors 4 may comprise general-purpose microprocessors, application-specific integrated circuits, or types of integrated circuits. For example, processors 4 may comprise Core processors manufactured by Intel Corp. of Santa Clara, Calif. or Athlon processors manufactured by Advanced Micro Devices of Sunnyvale, Calif. Each of processors 4 may include one of Level 1 (L1) caches 8A through 8N (collectively, "L1 caches 8"). L1 caches 8 may include a relatively small number of cache slots, but may be positioned within respective ones of processors 4 or in close proximity to respective ones of processors 4, thereby increasing the speed at which L1 caches 8 may return data or instructions stored in L1 caches 8 to respective ones of processors 4.

In addition, device 2 may comprise a main memory module 6. Memory module 6 may store data and software instructions. As illustrated in the example of FIG. 1, memory module 6 may store software instructions of a data utilization profiler (DUP) 12, software instructions of a function identification module (FIM) 14, software instructions of a cache initialization module (CIM) 16, software instructions of an address identification module (AIM) 28, and software instructions of a set of additional programs 18. Programs 18 may perform a wide variety of operations. For example, one of programs 18 may detect network attacks in network traffic that is flowing to device 2.

Furthermore, device 2 may comprise a Level 2 (L2) instruction cache 10. As discussed in detail below, L2 instruction cache 10 may be automatically programmed to store instructions utilized by processors 4. L2 instruction cache 10 may include a larger number of cache slots, but may be positioned further from processors 4 than L1 caches 8. Because L2 instruction cache 10 is positioned further from processors 4, L2 instruction cache 10 may return instructions stored in L2 instruction cache 10 at a rate that is slower than that of L1 caches 8 but faster than a rate that memory module 6 returns instructions. Processors 4 may share L2 instruction cache 10. That is, L2 instruction cache 10 may response to memory read requests from all of processors 4.

L2 instruction cache 10 may include n address cache slots 40 and n instruction cache slots 42. Each of address cache slots 40 may be capable of storing a memory address and each of instruction cache slots 42 may be capable of storing one or more software instructions. Each of address cache slots 40 may be associated with a slot index. Furthermore, each of instruction cache slots 42 may be associated with a slot index. These slot indexes may range from a to a+(n−1), where a is a lowest slot index and where n is equal to the number of address cache slots 40 and instruction cache slots 42. For example, where a equals zero and n equals 2048, the slot indexes associated with address cache slots 40 may range from 0 to 2047 and slot indexes associated with instruction cache slots 40 may range from 0 to 2047. When one of address cache slots 40 is associated with the same slot index as one of instruction cache slots 42, these cache slots may be referred to herein as "corresponding" cache slots.

One of processors 4 (e.g., processor 4A) may execute the software instructions of DUP 12. When processor 4A executes the instructions of DUP 12, processor 4A may "profile" rates at which processors 4 utilize various software instructions stored in memory module 6. For example, when processor 4A executes DUP 12, processor 4A may construct a histogram 24 in memory module 6 that records the frequency at which processors 4 utilize software instructions in memory module 6.

Each of processors 4 includes one of program counters 26A through 26N (collectively, "program counters 26.") Program counters 26 may comprise registers that store the memory addresses of software instructions that processors 4 are currently executing. Processor 4A, when executing DUP 12, may periodically retrieve the memory addresses stored in program counters 26. For example, processor 4A, when executing DUP 12, may retrieve the memory addresses stored in program counters 26 once every few milliseconds. When processor 4A retrieves a memory address from one of program counters 26, processor 4A may increment a value associated with the memory address in histogram 24. In this way, histogram 24 maintains a record of how many times processor 4A has retrieved a memory address from program counters 26. It should be further noted that the number of times that processor 4A has retrieved a given memory address from program counters 26 bears a direct relationship to the frequency at which processors 4 execute an instruction at the memory address. This is because, at any given moment in time, program counters 26 are more likely to store the memory addresses of software instructions that are executed frequently than memory addresses of software instructions that are executed less frequently. Because at any given moment in time program counters 26 are more likely to store the memory addresses of frequently executed software instructions, memory addresses of frequently executed software instructions are more likely to be in program counters 26 when processor 4A retrieves the memory addresses from program counters 26. In other words, the memory addresses retrieved by processor 4A may represent a statistical sample of the memory addresses stored in program counters 26. Alternatively, instructions of DUP 12 may cause processor 4A to periodically "snoop" on bus traffic flowing from processors 4 to memory module 6. When processor 4A snoops on bus traffic, processor 4A detects memory addresses for which processors 4 making read requests.

One of processors 4 (e.g., processor 4A) may periodically execute the software instructions of AIM 28. The software instructions of AIM 28 may cause processor 4A may use histogram 24 to identify up to n memory addresses that have the highest utilization frequencies, where n is the number of cache slots in address cache slots 40 and instruction cache slots 42. These n memory addresses are the memory addresses of memory locations in memory module 6 that store the software instructions that are most frequently executed by processors 4.

The instructions of AIM 28 may also cause processor 4A to execute the instructions of FIM 14. The instructions of FIM 14 may cause processor 4A to identify a minimal perfect hash function that maps memory addresses of the identified software instructions to different hash values that range from 0 to (n−1), wherein n is the number of cache slots in address cache slots 40 and instruction cache slots 42 in L2 instruction cache 10. A perfect hash function of a set S is a hash function that maps each different element in set S to a different number. In other words, a perfect hash function ensures that no two elements in set S are mapped to the same number. Because a perfect hash function does not map two elements in set S to the same number, there is no risk of a hash collision. In the context of device 2, the set S may constitute the memory addresses of the identified software instructions. Hence, the instructions of FIM 14 may cause processor 4A to identify a hash function that maps each different memory address in set S to a distinct integer hash value, and there are the same number of different memory addresses in set S as there are distinct integer hash values. The memory addresses of the identified software instructions indicate locations in memory module 6 that store the identified software instructions.

The instructions of FIM 14 may cause processor 4A to use a variety of algorithms to identify the minimal perfect hash function. For example, the instructions of FIM 14 may cause processor 4A to use an algorithm defined in one of the following papers:

F. C. Botelho, D. Menoti Gomes, N. Ziviani. "A New algorithm for constructing minimal perfect hash functions", Technical Report TR004/04, Department of Computer Science, Federal University of Minas Gerais, 2004, the entire content of which is hereby incorporated by reference. Other example perfect hash algorithms include the following:

F. C. Botelho, Y. Kohayakawa, and N. Ziviani. "A Practical Minimal Perfect Hashing Method." *4th International Workshop on efficient and Experimental Algorithms (WEA05)*, Springer-Verlag Lecture Notes in Computer Science, vol. 3505, Santorini Island, Greece, May 2005, 488-500.

Z. J. Czech, G. Havas, and B. S. Majewski. "An optimal algorithm for generating minimal perfect hash functions.", Information Processing Letters, 43(5):257-264, 1992.

E. A. Fox, Q. F. Chen, and L. S. Heath. "A faster algorithm for constructing minimal perfect hash functions." In Proc. 15th Annual International ACM SIGIR Conference on Research and Development in Information Retrieval, pages 266-273, 1992.

Bob Jenkins, "An order preserving minimal perfect hashing algorithm." available at http://burtleburtle.net/bob/hash/perfect.html (last visited Apr. 4, 2007).

The entire content of the foregoing references is hereby incorporated by reference. It should also be appreciated that the instructions of FIM 14 may cause processor 4A to perform algorithms other than those listed above.

In addition, the instructions of FIM 14 may cause processor 4A to execute the instructions of CIM 16. When the instructions of FIM 14 cause processor 4A to identify the minimal perfect hash function, processor 4A may identify one or more shifting coefficients and a set of reference values that characterize the identified minimal perfect hash function. The instructions of CIM 16 may cause processor 4A to program L2 instruction cache 10 to store these shifting coefficients and reference values of the identified minimal perfect hash function.

In addition, the instructions of CIM 16 may cause processor 4A to use the identified minimal perfect hash function to calculate a hash value for each of the identified memory addresses. After processor 4A calculates the hash values, the instructions of CIM 16 may cause processor 4A to identify, for each of the identified memory addresses, one of address cache slots 40 and one of instruction cache slots 42 in L2 instruction cache 10 that are indicated by the hash value that the identified minimal perfect hash function has mapped to the memory address. For example, each of address cache slots 40 and instruction cache slots 42 may be associated with slot indexes as described above. In this example, the instructions of CIM 16 may cause processor 4A to identify one of address cache slots 40 that is associated with a slot index equal to the hash value and to identify one of instruction cache slots 42 that is associated with a slot index equal to the hash value. The instructions of CIM 16 may then cause processor 4A to load the memory address into the identified one of address cache slots 40 and to load the software instruction stored in memory module 6 at the memory address into the identified one of instruction cache slots 42. Because the minimal perfect hash function maps each different memory addresses to a different hash value, the instructions of CIM 16 may cause processor 4A to store each of the identified memory address in a different one of address cache slots 40 and each software instruction at the identified memory addresses in a different one of instruction cache slots 42.

When processors 4 execute software instructions stored in memory module 6, processors 4 may generate requests to read software instructions that are stored at various memory locations of memory module 6 associated with various memory addresses. These software instructions may include software instructions of programs 18 and may also include software instructions of DUP 12, FIM 14, CIM 16, and AIM 28. When one of processors 4 generates a read request for a software instruction at a particular memory address, the processor may send the read request to a respective one of L1 caches 8. If this one of L1 caches 8 contains a cache slot associated with the memory address in the read request, the L1 cache may provide the software instruction stored in the cache slot to the processor. Otherwise, if the L1 cache does not contain a cache slot associated with the memory address in the read request, the L1 cache forwards the read request to L2 instruction cache 10.

When L2 instruction cache 10 receives a read request from one of processors 4, a cache lookup module 20 in L2 instruction cache 10 may apply the minimal perfect hash function identified by FIM 14 to calculate a hash value for the memory address in the read request. After calculating the hash value, cache lookup module 20 may identify one of address cache slots 40 that is indicated by the calculated hash value. For example, each of address cache slots 40 may be associated with a slot index. In this example, the calculated hash value may indicate one of address cache slots 40 when the calculated hash value equals the slot index associated with the address cache slot. After identifying one of address cache slots 40, cache lookup module 20 may then determine whether a memory address stored in the identified one of address cache slots 40 is equal to the memory address in the read request. If the memory address stored in the cache slot is not equal to the memory address in the read request, cache lookup module 20 may forward the read request to memory module 6. On the other hand, if the memory address stored in the identified one of address cache slots 40 is equal to the memory address in the read request, cache lookup module 20 may identify one of instruction cache slots 42 that is indicated by the hash value. Cache lookup module 20 may then provide a software instruction stored in the identified one of instruction cache slots 42 to the one of processors 4 that generated the read request.

The techniques of this invention may be used in a variety of scenarios. For example, a manufacturer of a specific type of device may know that devices of this type only execute software instructions in programs 18, that programs 18 have a static memory footprint, and that devices of this type are used for similar purposes. For example, a manufacturer may make intrusion detection devices that execute software instructions of one or more proprietary software applications in order to scan incoming network traffic for security threats. When the manufacturer knows that the devices only execute software instructions in programs 18 and that the devices are used for similar purposes, the manufacturer may use the techniques described above to program L2 instruction caches in each of the devices when the devices are manufactured. In the previous example, most network traffic does not include security threats. For this reason, the manufacturer would know that the intrusion detection devices are more likely to execute software instructions that process non-threatening network traffic than to execute software instructions associated that process network traffic that contains a security threat. Therefore, the manufacturer could use the techniques described in this disclosure to identify the most frequently executed software instructions and to identify a minimal perfect hash function for these software instructions. The manufacturer could then manufacture the intrusion detection devices such that L2 instruction caches of the intrusion detection devices store the identified software instructions and the L2 instruction caches use the identified minimal perfect hash function to retrieve the identified software instructions.

The techniques described in this disclosure may present several advantages. For example, these techniques may considerably simplify the structure of L2 instruction cache 10. When L2 instruction cache 10 operates as described in this disclosure, L2 instruction cache 10 may only require a single comparator, whereas other implementations of an associative L2 cache may require a significant number of comparators. Furthermore, because L2 instruction cache 10 may contain fewer comparators than typical associative L2 caches, L2 instruction cache 10 may consume less power. In addition, because cache lookup module 20 may apply minimal perfect hash function to calculate a hash value for a memory address very quickly and because only a single comparison is necessary after calculating the hash value, L2 instruction cache 10 may respond to a read request faster than a typical associative cache.

Figure 2:
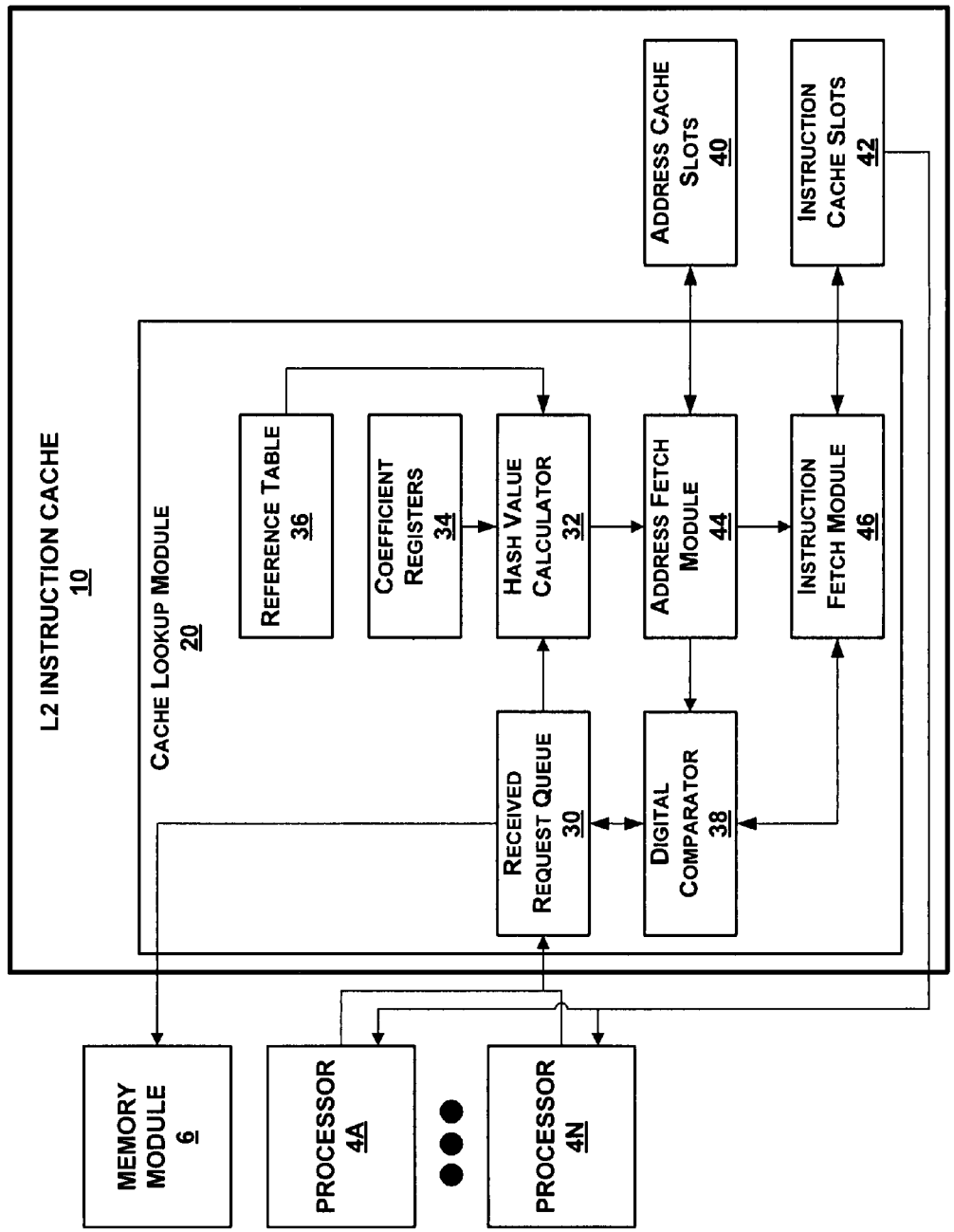
FIG. 2 is a block diagram illustrating exemplary details of a cache lookup module.

FIG. 2 is a block diagram illustrating example details of L2 instruction cache 10. As illustrated in the example of FIG. 2, cache lookup module 20 comprises a received request queue 30, a hash value calculator 32, a set of coefficient registers 34, a reference table 36, a digital comparator 38, an address fetch module 44, and an instruction fetch module 46. Received request queue 30 may comprise a set of registers that store read requests issued by processors 4. Coefficient registers 34, reference table 36, address cache slots 40, and instruction cache slots 42 may comprise static random access memory (SRAM) modules, dynamic random access memory (DRAM) modules, flash memory modules, sets of registers, or other volatile or non-volatile data storage modules. Address cache slots 40 may include one memory location for each memory location in instruction cache slots 42. For example, if instruction cache slots 42 includes 2048 memory locations, address cache slots 40 may also include 2048 memory locations.

When L2 instruction cache 10 receives a read request from one of processors 4, the read request is temporarily stored in received request queue 30. When received request queue 30 stores a read request, hash value calculator 32 may calculate a hash value for a memory address specified by the read request in received request queue 30. In order to calculate the hash value for the memory address, hash value calculator 32 may access a set of coefficient registers 34 and a reference table 36. Coefficient registers 34 may store shifting coefficients and reference table 36 may store reference values. The shifting coefficients and reference values characterize the identified perfect hash function. One of processors 4 may set values in coefficient registers 34 and reference table 36 when that processor executes FIM 14.

Hash value calculator 32 may use values in coefficient registers 34 and reference values in reference table 36 to calculate a first hash value. In order to calculate the first hash value for a memory address in a read request, hash value calculator 32 may calculate a first intermediate value by applying the shifting coefficients in coefficient registers 34 to the memory address. Hash value calculator 32 may then use some or all of the first intermediate value to identify an entry in reference table 36. Hash value calculator 32 may then retrieve a second intermediate value by extracting the value from the identified entry in reference table 36. Hash value calculator 32 may then perform an exclusive or (XOR) operation on the first value and the second value to obtain the hash value. Example operations to calculate the hash value are explained in detail in the work cited above.

After hash value calculator 32 calculates the hash value, hash value calculator 32 may provide the hash value to address fetch module 44 and to instruction fetch module 44. When address fetch module 44 receives the hash value, address fetch module 44 may retrieve a memory address from one of address cache slots 40 that is indicated by the hash value. For example, suppose that address cache slots 40 includes 2048 memory locations. In this example, address fetch module 44 may retrieve an 11-bit hash value from hash value calculator 32. The 11-bit hash value uniquely identifies one of the memory locations in address cache slots 40 because $2^{11}$=2048. After address fetch module 44 retrieves the memory address, address fetch module 44 may provide the memory address to digital comparator 38. Digital comparator 38 compares the memory address received from address fetch module 44 with the memory address of the current read request. If the memory addresses are equal, digital comparator 38 may cause instruction fetch module 46 to retrieve a software instruction in one of instruction cache slots 42 that is indicated by the hash value. Instruction fetch module 46 may then forward the software instruction to the one of processors 4 that originated the read request. Otherwise, if the memory addresses are not equal, digital comparator 38 may cause received request queue 30 to forward the current read request to memory module 6.

Figure 3:
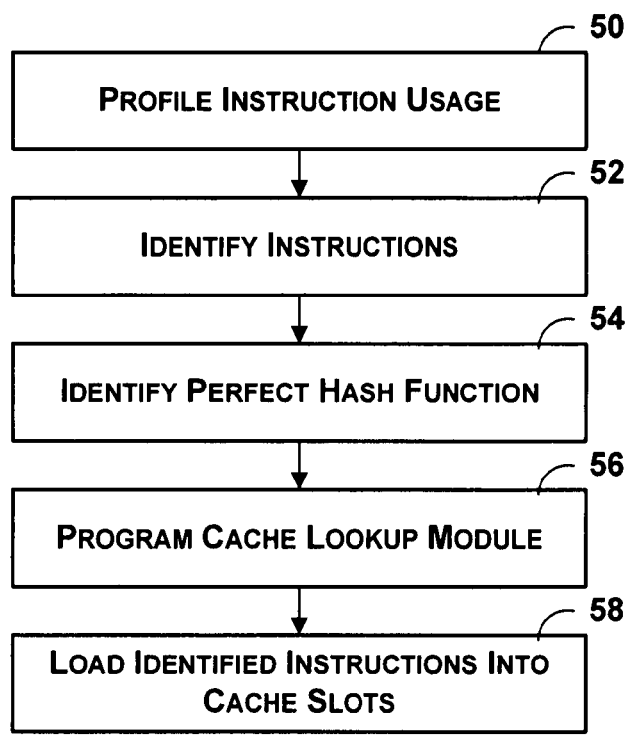
FIG. 3 is a flowchart illustrating an example operation of a processor to configure a L2 instruction cache.

FIG. 3 is a flowchart illustrating an example operation of a processor to configure a L2 instruction cache. Initially, one of processors 4 (e.g., processor 4A) may execute the instructions of DUP 12. The instructions of DUP 12 may cause processor 4A to profile the software instruction usage of processors 4 (50). This disclosure describes an example operation by which processor 4A may profile the software instruction usage of processors 4 in FIG. 4. Next, processor 4A may execute the instructions of AIM 28. The instructions of AIM 28 may cause processor 4A to use histogram 24 to identify up to n software instructions that processors 4 used most frequently, where n is the number of cache slots in address cache slots 40 and instructions cache slots 42 (52). After processor 4A identifies the software instructions, processor 4A may execute the instructions of FIM 14. The instructions of FIM 14 may cause processor 4A to identify a minimal perfect hash function that maps memory addresses of each of the identified memory addresses to a different hash value between 0 and (n−1) (54). For example, the instructions of FIM 14 may cause processor 4A to identify shifting coefficients and reference values that characterize the identified perfect hash function.

After processor 4A identifies the minimal perfect hash function, processor 4A may execute the instructions of CIM 16. The instructions of CIM 16 may cause processor 4A to program L2 instruction cache 10 to utilize the identified minimal perfect hash function (56). In addition, the instructions of CIM 16 may cause processor 4A to load each of the identified software instructions into ones of instruction cache slots 42 indicated by respective hash values and to load memory addresses of the identified instructions into ones of address cache slots 40 indicated by respective values (58). For example, a first memory address is associated with a first software instruction. If the identified minimal perfect hash function maps a first memory address to the hash value "5", the instructions of CIM 16 may cause processor 4A to load the first memory address into a one of address cache slots 40 associated with the slot index of "5" and may load the first instruction into one of instruction cache slots 42 associated with the slot index of "5."

Figure 4:
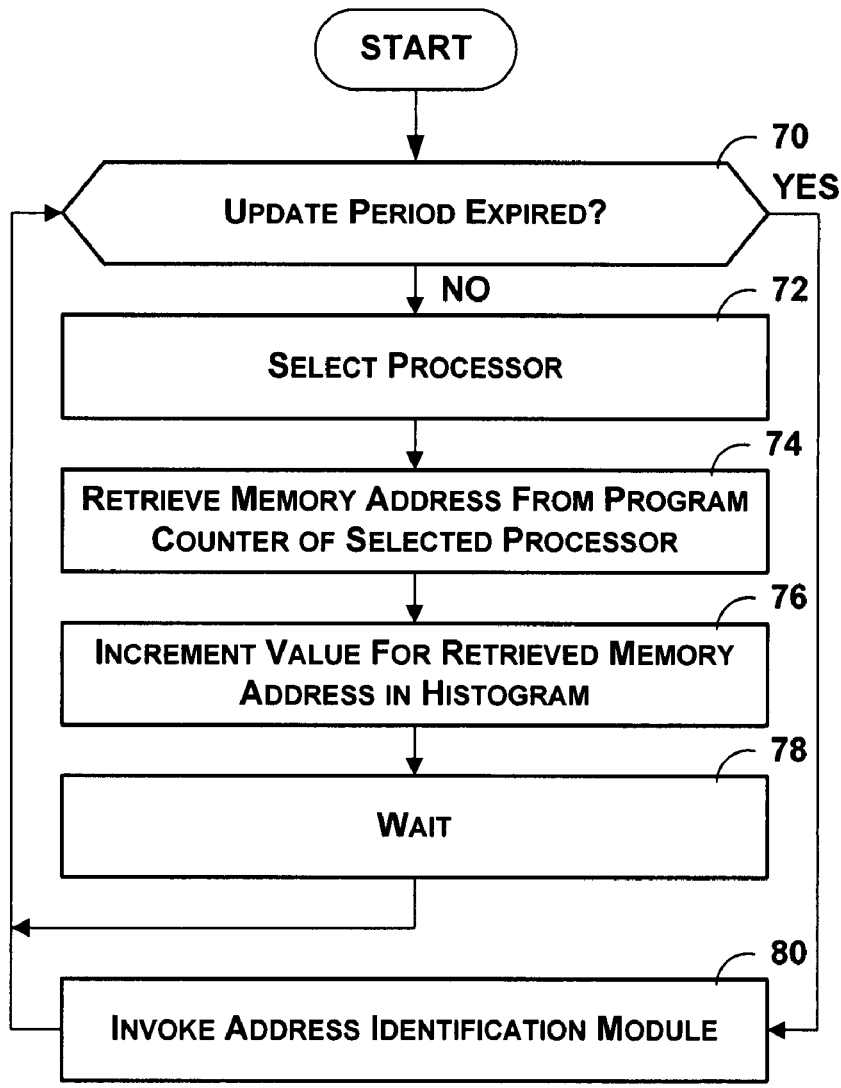
FIG. 4 is a flowchart illustrating an example operation of a processor to profile the instruction usage of processors in the device.

FIG. 4 is a flowchart illustrating an example operation of processor 4A to profile the software instruction usage of processors 4 in device 2. Initially, the instructions of DUP 12 may cause processor 4A to determine whether an update period has expired (70). The update period determines the frequency at which L2 instruction cache 10 is reprogrammed. For example, an administrator may set the update period to one day or one hour.

If the update period has not expired, ("NO" of 70), the instructions of DUP 12 may cause processor 4A to select one of processors 4 (72). For example, the instructions of DUP 12 cause processor 4A to select one of processors 4 on a pseudo-random basis. Furthermore, the instructions of DUP 12 may be configured to include the one of processors 4 that executes DUP 12 when selecting the one of processors 4 or to exclude the one of processors 4 that executes DUP 12 when selecting the one of processors 4. After processor 4A selects one of processors 4, the instructions of DUP 12 may cause processor 4A to retrieve a memory address from the one of program counters 26 in the selected one of processors 4 (74). As discussed above, the memory addresses in program counters 26 are the memory addresses of software instructions that processors 4 are currently executing.

When processor 4A retrieves a memory address from one of program counters 26, the instructions of DUP 12 may cause processor 4A to increment a value in histogram 24 that is associated with the retrieved memory address (76). For example, histogram 24 may associate a memory address with the number twenty-five. The number twenty-five may indicate that the memory address has been retrieved from program counters 26 twenty-five times after the L2 instruction cache 10 has been reprogrammed. In this example, when processor 4A retrieves this memory address, processor 4A may increment the number twenty-five by one. As a result, the number twenty-six may be associated with the memory address in histogram 24.

After processor 4A increments the value for the retrieved memory address, the instructions of DUP 12 may cause processor 4A to wait a given period of time (78). For example, the instructions of DUP 12 may cause processor 4A to wait ten milliseconds. While processor 4A is waiting, processor 4A may execute software instructions of other processes. After the period of time has elapsed, the instructions of DUP 12 may cause processor 4A to loop back and to again determine whether the update period has expired (70).

If the update period has expired ("YES" of 70), the instructions of DUP 12 may cause processor 4A to invoke AIM 28 (80). When processor 4A invokes AIM 28, processor 4A may begin executing the instructions of AIM 28. After causing processor 4A to invoke AIM 28, the instructions of DUP 12 may cause processor 4A to again determine whether the update period has expired (70).

Figure 5:
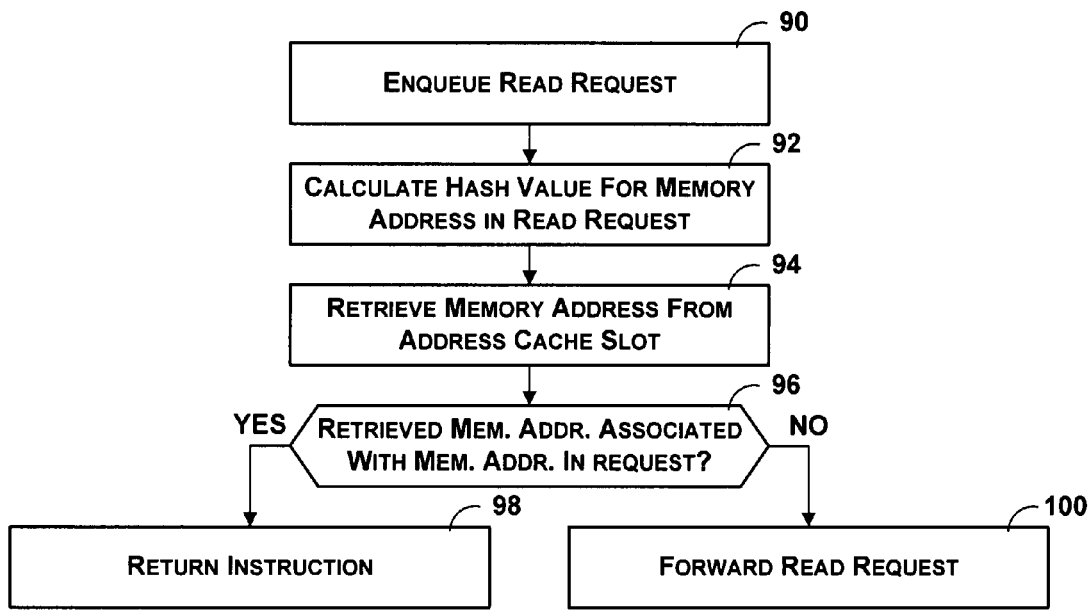
FIG. 5 is a flowchart illustrating an example operation of the cache lookup module.

FIG. 5 is a flowchart illustrating an example operation of L2 instruction cache 10. When L2 instruction cache 10 receives a read request, the read request may be temporarily enqueued in received request queue 30 (90). Hash value calculator 32 may use the shifting coefficients stored in coefficient registers 34 and reference values stored in reference table 36 to apply the identified minimal perfect hash function to a memory address in the read request in order to calculate a hash value for the memory address (92). Next, address fetch module 44 may provide to digital comparator 38 a memory address stored in a one of address cache slots 40 that is indicated by the hash value (94). After receiving the memory address, digital comparator 38 may determine whether the memory address received from address fetch module 44 is equal to the memory address in the read request (96).

If the digital comparator 38 determines that memory address received from address fetch module 44 is equal to the memory address in the read request ("YES" of 96), digital comparator 38 may output a signal that causes instruction fetch module 46 to return the software instruction stored in a one of instruction cache slots 42 indicated by the hash value (98). Otherwise, if the digital comparator 38 determines that memory address received from address fetch module 44 is not equal to the memory address in the read request ("NO" of 96), digital comparator 38 may output a signal that causes received request queue 30 to forward the read request to a higher level in the memory hierarchy (100). For example, the read request may be forwarded to a Level 3 cache (not shown) or to main memory module 6.

While this disclosure has explained the examples of FIGS. 1-5 in terms of software instructions, it should be noted that the techniques described in disclosure are not limited to the caching of software instructions. Rather, any type of data unit may be cached in accordance with these techniques. For example, enterprise data, video data, audio data, document data, network data, or any other type of data may be cached in accordance with the techniques described in this disclosure.

In one or more exemplary embodiments, the functions described may be implemented in hardware, software, and/or firmware, or any combination thereof. If implemented in hardware, the functions may be implemented in one or more microprocessors, microcontrollers, digital signal processors (DSPs), application specific integrated circuits (ASICs), field programmable gate arrays (FPGAs), or the like. Such components may reside within a communication system, data writing and/or reading system, or other systems. If implemented in software, the functions may be stored as one or more instructions or code on a computer-readable medium. Computer-readable media includes computer storage media. A storage medium may be any available media that can be accessed by a computer. By way of example, and not limitation, such computer-readable media can comprise random-access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Storage media may comprise computer program products. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various embodiments of the invention have been described. These and other embodiments are within the scope of the following claims.

The invention claimed is:

1. A method comprising:
   profiling, with a network device deployed within a network, rates at which one or more processors of the network device utilize different software instructions, wherein the software instructions are stored to a memory of the network device and executed by the network device to process network communications;
   identifying, with the network device based on the profiled rates, a set of software instructions that are most frequently utilized by the one or more processors to process the network communications;
   identifying, with the network device, a perfect hash function that only maps memory addresses of the identified set of software instruction to different hash values, wherein each of the different hash values corresponds to a different instruction cache slot of a fully associative instruction cache module of the network device;
   programming, with the network device, the fully associative instruction cache module of the network device to apply the perfect hash function, wherein the fully associative instruction cache module includes a set of instruction cache slots, and wherein each instruction cache slot is capable of being associated with any memory address of the memory;
   loading, with the network device, each of the identified software instructions into the corresponding instruction cache slots indicated by the hash values calculated by applying the first perfect hash function to the memory addresses of the identified software instructions;
   receiving, with the fully associative cache module, a read request for one of the instructions stored to a memory address of the memory;
   applying, with the fully associative cache module, the perfect hash function to the memory address in order to calculate a hash value that indicates one of the instruction cache slots when the fully associative cache module receives the read request;
   determining whether the one of the instruction cache slots stores the software instruction requested by the read request;
   returning a copy of the one of the instructions that is stored in the one of the instruction cache slots in response to the determination that the one of the instruction cache slots stores the software instruction requested by the read request; and
   forwarding the read request to the memory in response to the determination that the software instruction requested by the read request-has a memory address that is not within the set of memory addresses for which the perfect hash function was calculated and cannot be retrieved from the fully associative cache module.

2. The method of claim 1, wherein profiling the rates comprises profiling the rates while one of the processors is executing one or more computer programs.

3. The method of claim 2, wherein profiling rates at which the one or more processors utilizes different software instructions comprises repeatedly retrieving memory addresses of the software instructions from a program counter of the one of the processors.

4. The method of claim 3,
   wherein the one of the processors is a first one of the processors, and
   wherein repeatedly retrieving memory addresses comprises retrieving the memory addresses with a second one of the processors in the network device.

5. The method of claim 3,
   wherein the one or more processors include a plurality of processors, and
   wherein repeatedly retrieving memory addresses comprises:
   selecting a processor from the plurality of processors in the network device; and
   retrieving one of the memory addresses from the program counter of the selected one of the processors.

6. The method of claim 5, wherein identifying software instructions comprises identifying software instructions that are most frequently used by the plurality of processors based on the profiled rates.

7. The method of claim 3, wherein repeatedly retrieving memory addresses comprises:
   obtaining a statistical sample of memory addresses stored in the program counter of the one of the processors; and
   using the statistical sample to profile the rates at which the one of the processors utilizes the different software instructions.

8. The method of claim 1,
wherein profiling the rates comprises constructing a histogram that measures the frequency at which the one of the processors utilizes the different software instructions, and
wherein identifying software instructions comprises identifying the software instructions based on the histogram.

9. The method of claim 1, further comprising executing a computer program with one of the processors,
wherein executing the computer program comprises:
generating the read request to read an instruction at the memory address; and
executing the copy of the one of the software instructions after the one of the processors receives the copy of the one of the instructions from the cache module.

10. The method of claim 9, wherein executing the computer program comprises detecting a network attack in network traffic that flows to the network device.

11. The method of claim 1, wherein identifying the perfect hash function comprises identifying a minimal perfect hash function that, for each of the identified software instructions, maps a memory address of the identified instructions to a different one of a consecutive set of integers.

12. The method of claim 11, wherein identifying the perfect hash function comprises applying a Botelho-Menoti-Ziviani (BMZ) algorithm to the memory addresses of the identified software instructions in order to identify the minimal perfect hash function.

13. The method of claim 1,
wherein identifying the perfect hash function comprises calculating shifting coefficients and reference values that characterize the perfect hash function;
wherein programming the fully associative instruction cache module to apply the perfect hash function comprises loading the shifting coefficients and reference values into the fully associative instruction cache module; and
wherein applying the perfect hash function comprises using the shifting coefficients and the reference values to calculate the hash value.

14. The method of claim 1, wherein the cache module includes a single digital comparator.

15. The method of claim 1,
wherein the fully associative instruction cache module includes a set of address cache slots;
wherein the method further comprises loading, for each of the identified software instructions, a memory address of the identified software instruction into one of the set of address cache slots indicated by the hash value calculated by applying the perfect hash function to the memory address,
wherein determining whether the one of the instruction cache slots stores the software instruction comprises:
identifying one of the address cache slots that is indicated by the hash value;
determining whether a memory address stored in the one of the address cache slots is equal to the memory address,
wherein forwarding the read request to the memory comprises forwarding the read request to the memory when the memory address stored in the one of the address cache slots is not equal to the memory address of the read request, and
wherein returning the copy of the one of the software instructions comprises returning the copy of the one of the software instructions when the memory address stored in the one of the address cache slots is equal to the memory address of the read request.

16. The method of claim 15, wherein determining whether the memory address stored in the one of the address cache slots is equal to the memory address of the read request comprises determining whether the memory address stored in the one of the address cache slots is equal to the memory address of the read request with a digital comparator.

17. The method of claim 1, wherein one of the processors of the first network device sends the first read request to the fully associative instruction cache module.

18. The method of claim 1,
wherein the set of software instructions comprise a first set of software instructions,
wherein the perfect hash function comprises a first perfect hash function,
wherein the memory address of the first set of software instructions comprise first memory addresses of the first set of software instructions, and
wherein the different hash values comprise first set of different hash values, and
the method further comprising:
re-profiling rates at which the one or more processors of the network device utilize the software instructions;
using the re-profiled rates to identify a second set of software instructions that are most frequently utilized by the one or more processors, wherein the first set and second set of software instructions include at least one or more different instructions for processing the network communications;
identifying, with the network device, a replacement perfect hash function that, for each of the identified software instructions in the second set of software instructions, maps second memory addresses of the second set of identified software instruction to second set of different-hash value;
programming the cache module to apply the replacement perfect hash function; and
loading each of the identified software instructions in the second set of software instructions into instruction cache slots indicated by the second set of different hash values calculated by applying the replacement perfect hash function to the second memory addresses of the identified software instructions.

19. The method of claim 1, wherein the fully associative instruction cache module is a Level 2 fully associative instruction cache that receives read requests from the one or more processors.

20. A device comprising:
one or more processors;
a memory that stores software instructions of computer programs;
a data utilization profiler (DUP) that profiles rates at which the one or more processors utilize different one of the software instructions of the computer programs to process network communications;
an address identification module (AIM) that identifies, based on the rates, a set of the software instructions that are most frequently utilized by the one or more processors to process the network communications;
a function identification module (FIM) that identifies a perfect hash function that, for each of the identified software instructions, only maps a memory address of each one of the identified set of software instructions to a different hash value, wherein each of the different hash values corresponds to a different instruction cache slot of a fully associative instruction cache module of the network device; and the fully associative instruction cache module that comprises:
a set of instruction cache slots that are capable of storing the software instructions, wherein each instruction cache slot is capable of being associated with any memory address of the memory; and
a hash value calculator that applies the perfect hash function to the memory addresses in order to generate hash values that indicate ones of the cache slots;
a cache initialization module that programs the cache module to apply the perfect hash function and to load each of the identified software instructions into the corresponding instruction cache slots indicated by the hash values calculated by applying the perfect hash function to the memory addresses of the identified software instructions,
wherein, when the fully associative instruction cache module receives a read request for one of the software instructions stored to a memory address of the memory, the hash value calculator applies the perfect hash function to the memory address of the read request in order to calculate a hash value that indicates one of the instruction cache slots; and
a single comparator to determine whether the one of the instruction cache slots stores the software instruction requested by the read request;
wherein the cache module returns an instruction stored in a first one of the instruction cache slots in response to the determination that the one of the instruction cache slots stores the software instruction requested by the read request and forwards the read request to the memory in response to the determination that the software instruction requested by the read request has a memory address that is not within the set of memory addresses for which the perfect hash function was calculated and cannot be retrieved from the fully associative cache module.

21. The device of claim 20, wherein the DUP profiles the rates while the one or more processors are executing one or more computer programs.

22. The device of claim 21, wherein the DUP repeatedly retrieves memory addresses of the software instructions from a program counter of one of the one or more processors.

23. The device of claim 22, wherein the DUP comprises a software program executing on another one of the one or more processors in the network device.

24. The device of claim 22,
wherein the one or more processors comprise a plurality of processors, wherein the one of the processor is one of the plurality of processors, and
wherein, when the DUP repeatedly retrieves memory addresses, the DUP selects a one of the plurality of processors and retrieves one of the memory addresses from the program counter of the selected one of the processors.

25. The device of claim 22, wherein the DUP obtains a statistical sample of memory addresses in the program counter of the one of the processors and uses the statistical sample to profile the rates at which the one of the processors utilizes the different software instructions.

26. The device of claim 20,
wherein, when the DUP profiles the rates, the DUP constructs a histogram that measures the frequency at which the one of the processors utilizes each of the different software instructions, and wherein the AIM identifies the software instructions based on the histogram.

27. The device of claim 20,
wherein, when the one of the processors executes one of the computer programs, the one of the computer programs causes the one of the processors to generate the read request, and
wherein the one of the processors executes the copy of the instruction after the one of the processors receives the copy of the instruction from the fully associative instruction cache module.

28. The device of claim 27, wherein the one of the computer programs causes the one of the processors to detect a network attack in network traffic that flows to the device.

29. The device of claim 20, wherein, when the function identification module identifies the perfect hash function, the function identification module identifies a minimal perfect hash function that, for each of the identified software instructions, maps the memory address of each of the identified software instructions to a different one of a consecutive set of integers.

30. The device of claim 29, wherein the function identification module applies a Botelho-Menoti-Ziviani (BRZ) algorithm to the memory addresses of the identified software instructions to identify the minimal perfect hash function.

31. The device of claim 29,
wherein the function identification module calculates shifting coefficients and reference values that characterize the perfect hash function;
wherein the cache initialization module loads the shifting coefficients and reference values into the fully associate instruction cache module; and
wherein the cache lookup module calculates the hash value based on the shifting coefficients and the reference values.

32. The device of claim 20,
wherein the fully associative instruction cache module includes the one comparator, and
wherein the comparator comprises a digital comparator.

33. The device of claim 20,
wherein the comparator comprises a digital comparator,
wherein the cache module further comprises a set of address cache slots that are capable of storing memory addresses,
wherein the cache initialization module loads, for each memory address of the identified software instructions, a copy of the memory address into an address cache slot that is indicated by a hash value of the memory address calculated using the perfect hash function; and
wherein the digital comparator causes the cache module to return the software instruction stored in the one of the instruction cache slots when a memory address stored in a one of the address cache slots indicated by the hash value is equal to the memory address; and
wherein the digital comparator causes the cache module to forward the read request to the memory when the memory address stored in the one of the address cache slots indicated by the hash value is not equal to the first memory address.

34. The device of claim 33, wherein the fully associative instruction cache module is a Level 2 fully associative instruction cache that receives read requests from the one or more processors.

35. The device of claim 20,
wherein the DUP periodically re-profiles rates at which the one or more processors utilize different software instructions;

wherein the AIM uses the re-profiled rates to identify another set of software instructions that are most frequently utilized by the one or more processors;

wherein the FIM identifies another perfect hash function that, for each of the identified software instructions in the other set of software instructions, maps memory addresses of the other set of software instructions to another set of different hash values; and a cache initialization module that programs the cache module to apply the other perfect hash function and to load each of the identified software instructions in the other set of software instructions into instruction cache slots indicated by hash values calculated by applying the other perfect hash function to the memory addresses of the other set of identified software instructions.

36. A computer-readable storage medium storing software instructions that cause at least one of one or more processors of a computing device to:

profile rates at which the one or more processors of the computing device utilize different ones of the software instructions to process network communications;

identify, based on the profiled rates, software instructions that are most frequently utilized by the one or more processors to process the network communications;

identify a perfect hash function that only, for each of the identified software instructions, maps a memory address of the identified software instruction to a different hash value, wherein each of the different hash values corresponds to a different instruction cache slot of a fully associative instruction cache module of the network device;

program a fully associative instruction cache module to apply the perfect hash function, wherein the fully associative instruction cache module includes a set of instruction cache slots, and wherein each of the set of instruction cache slots is capable of being associated with any memory address of the computer-readable storage medium;

load each of the identified software instructions into the corresponding instruction cache slots indicated by hash values calculated by applying the perfect hash function to the memory addresses of the identified software instructions;

wherein the cache module receives a read request for a memory address, applies the perfect hash function to the memory address in order to calculate a hash value that indicates one of the instruction cache slots, determines whether the one of the instruction cache slots stores the software instruction requested by the read request, returns a copy of a one of the instructions that is stored in the first one of the instruction cache slots in response to the determination that the one of the instruction cache slots stores the software instruction requested by the read request, and forwards the read request to the memory in response to the determination that the software instruction requested by the read request has a memory address that is not within the set of memory addresses for which the perfect hash function was calculated and cannot be retrieved from the fully associative cache module.

37. The computer-readable medium of claim 36, wherein the cache module includes a set of address cache slots;

wherein the software instructions further cause the at least one of the one or more processors to load, for each of the identified software instructions, a memory address of the identified software instruction into one of the address cache slots indicated by the a hash value calculated by applying the perfect hash function to the memory address of the read request; and wherein the cache module identifies one of the address cache slots that is indicated by the hash value, determines whether a memory address stored in the one of the address cache slots is equal to the memory address of the read request returns the copy of the one of the instructions when the memory address stored in the one of the address cache slots is equal to the memory address of the read request, and forwards the read request to the memory when the memory address stored in the one of the address cache slots is not equal to the memory address of the read request.

* * * * *